United States Patent [19]
Su

[11] Patent Number: 6,031,901
[45] Date of Patent: Feb. 29, 2000

[54] PAY PHONE

[76] Inventor: Li-Chuan Su, No. 32, Hsin-Chi St., Tso-Ying Dist., Kaohsiung City, Taiwan

[21] Appl. No.: 09/128,475

[22] Filed: Aug. 4, 1998

[51] Int. Cl.[7] .................................................. H04M 17/00
[52] U.S. Cl. ......................... 379/143; 379/150; 379/153; 379/155
[58] Field of Search ........................... 379/143, 145–146, 379/147–150, 152, 153, 155, 425–428; 194/205–207, 344–347

[56] References Cited

U.S. PATENT DOCUMENTS

| | | | |
|---|---|---|---|
| 3,759,441 | 9/1973 | Hamilton et al. ...................... | 232/57.5 |
| 5,483,583 | 1/1996 | Chen ..................................... | 379/146 |
| 5,704,463 | 1/1998 | Morales ................................. | 194/345 |
| 5,887,053 | 3/1999 | McGough ............................. | 379/145 |
| 5,949,863 | 9/1999 | Tansky .................................. | 379/143 |

*Primary Examiner*—Curtis A. Kuntz
*Assistant Examiner*—Duc Nguyen
*Attorney, Agent, or Firm*—Varndell & Varndell, PLLC

[57] ABSTRACT

A pay phone includes a buffer block provided to buffer the falling of inserted coins, enabling inserted coins to be guided through a coin track and detected by sensor means, a motor controlled to turn a coin receiving control board through a set of gears, enabling inserted coins to be positively received by a coin receiving unit, and a link turned with a coin return unit to close the coin receiving unit when the handset is hung up.

2 Claims, 12 Drawing Sheets

PAY PHONE

BACKGROUND OF THE INVENTION

The present invention relates to a pay phone, and more particularly to such a pay phone which uses a motor to turn a coin receiving control board, enabling a coin receiving unit to be positively opened upon insertion of coins, or closed when the handset is hung up.

Regular pay phones commonly use a relay to induce electric current. When the exchange line is connected, a magnetic force is produced to attract a coin receiving unit, causing it to open the coin passage. This design is not durable in use. Another drawback of conventional pay phones is that an inserted coins may jump before getting into the coin passage, causing the coin detector to make an error detection. Furthermore, conventional pay phones cannot protect the user from pulling the inserted coin back by a thin wire after a call.

SUMMARY OF THE INVENTION

According to one aspect of the present invention, buffer block means is provided to buffer the falling speed of inserted coins, enabling inserted coins to be guided through a coin track to a coin box or coin return assembly smoothly. According to another aspect of the present invention, a motor is provided and controlled to turn a coin receiving control board through a set of gears, enabling inserted coins to be positively received and guided to the coin box or coin return assembly. According to still another aspect of the present invention, a link is turned with a coin return unit to close the coin receiving unit when the handset is hung up.

DETAILED DESCRIPTION OF THE PREFERRED EMBODIMENT

Figure 1:
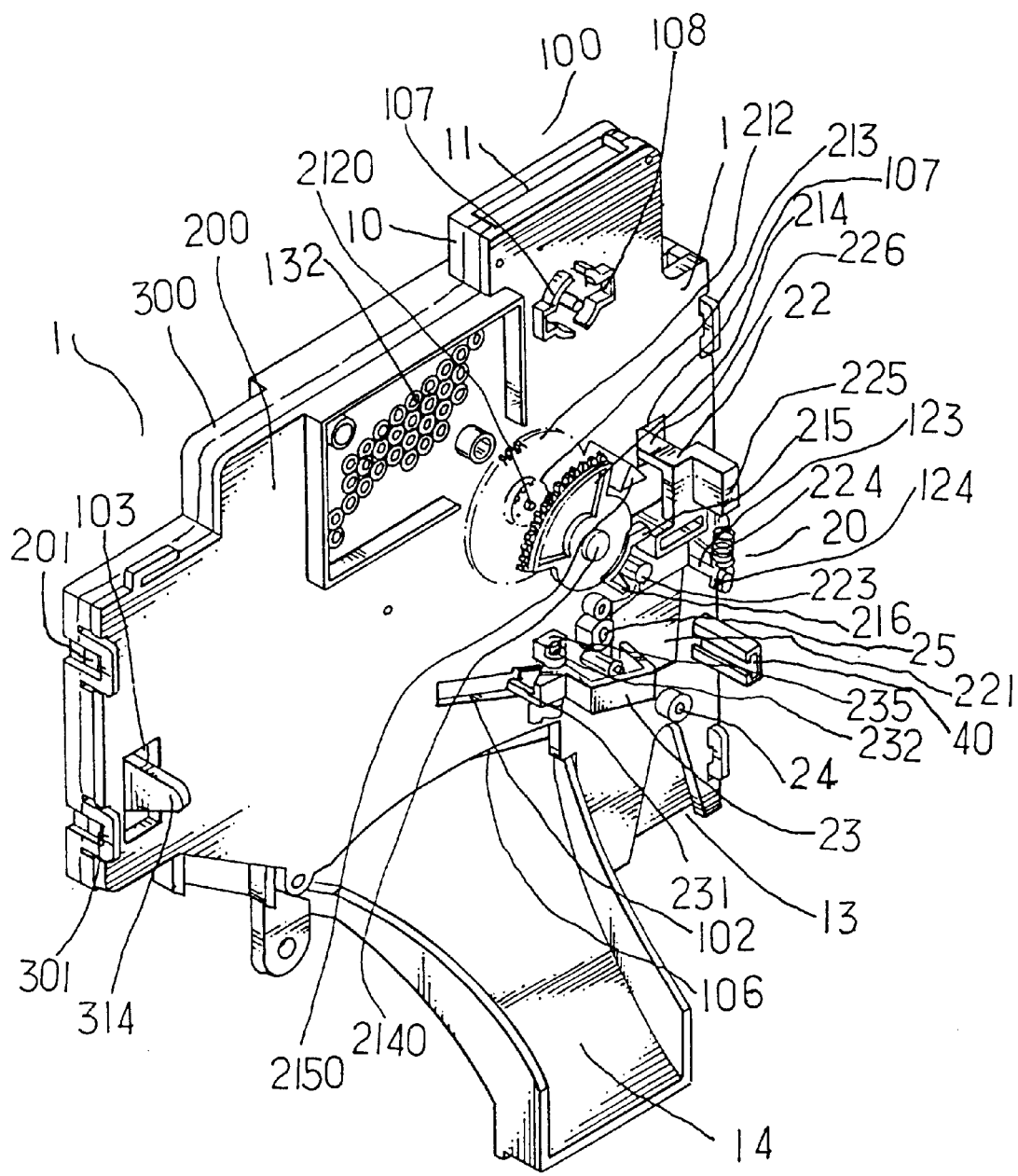
FIG. 1 is a perspective view of the present invention.
Figure 2:
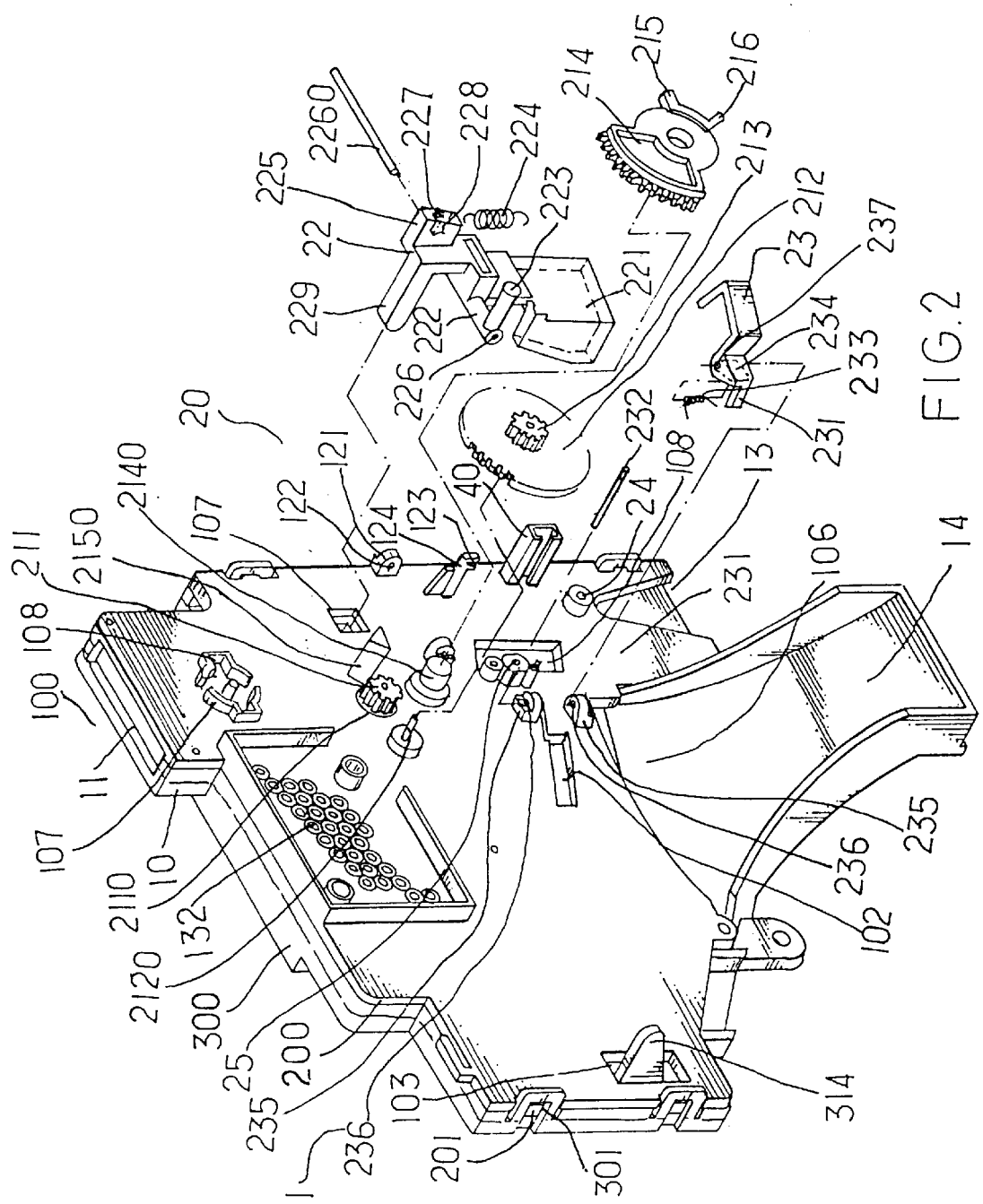
FIG. 2 is an exploded view of a part of the present invention.
Figure 3:
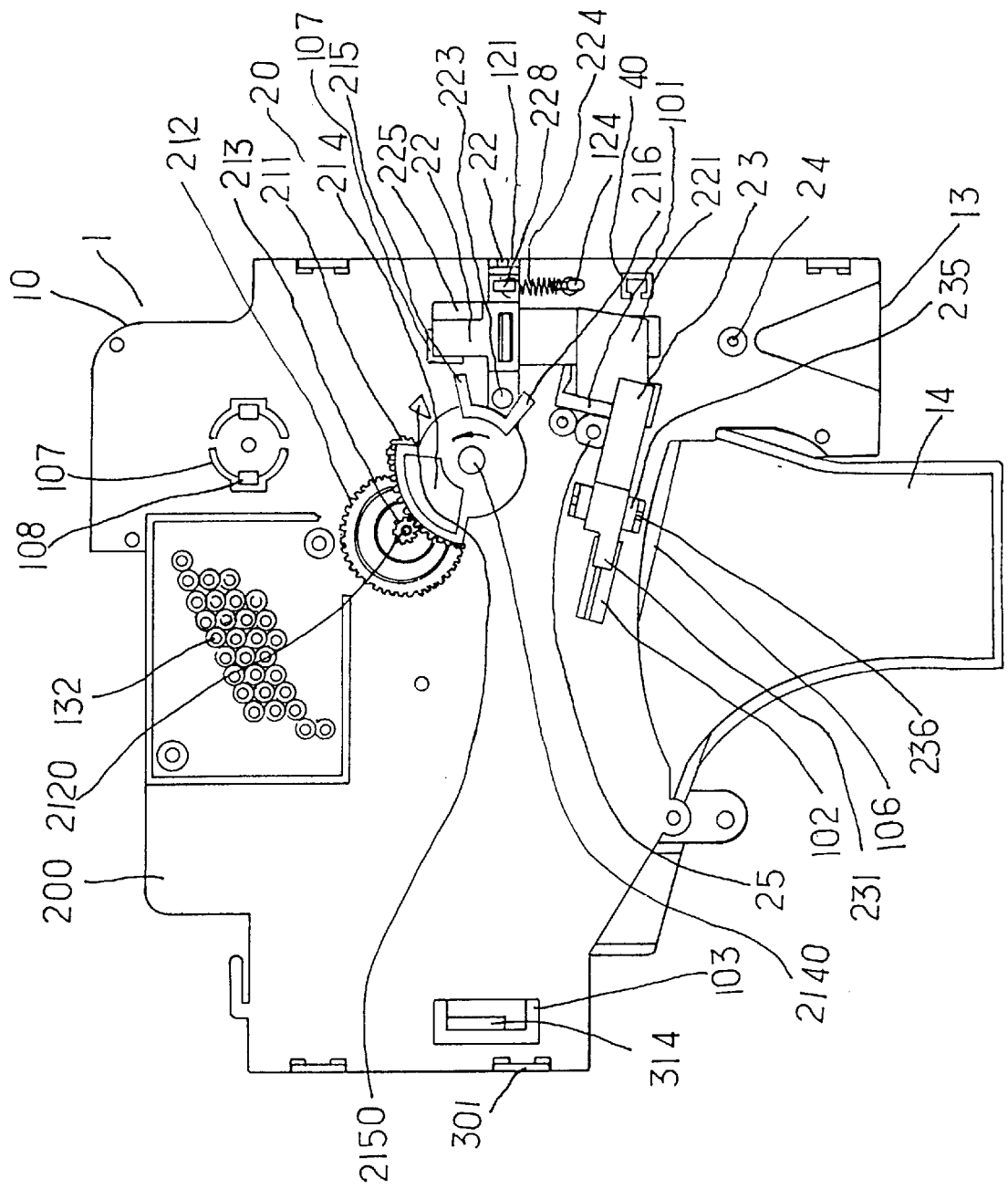
FIG. 3 is a front view of the present invention.
Figure 4:
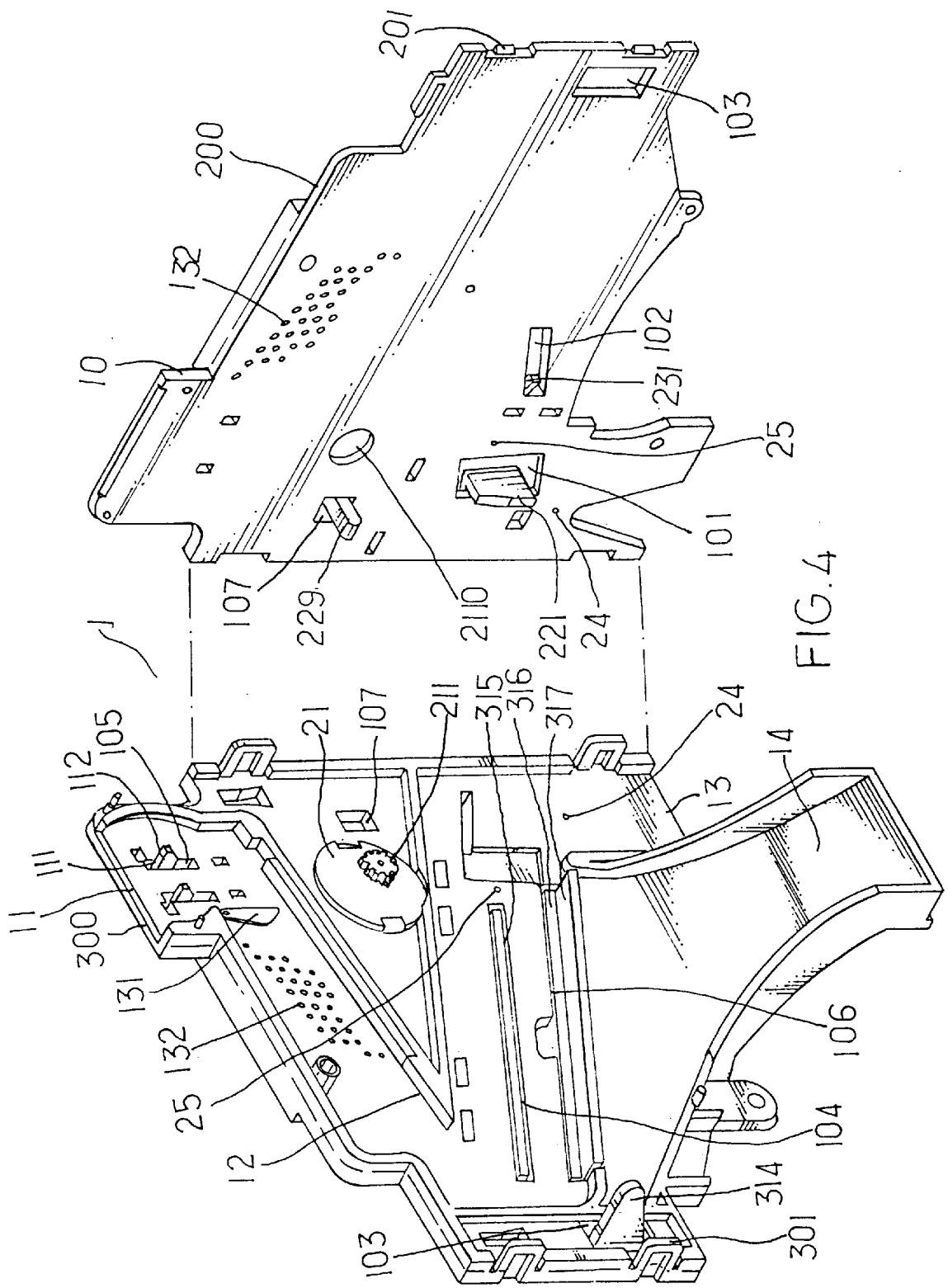
FIG. 4 is an exploded view of the frame unit according to the present invention.
Figure 5:
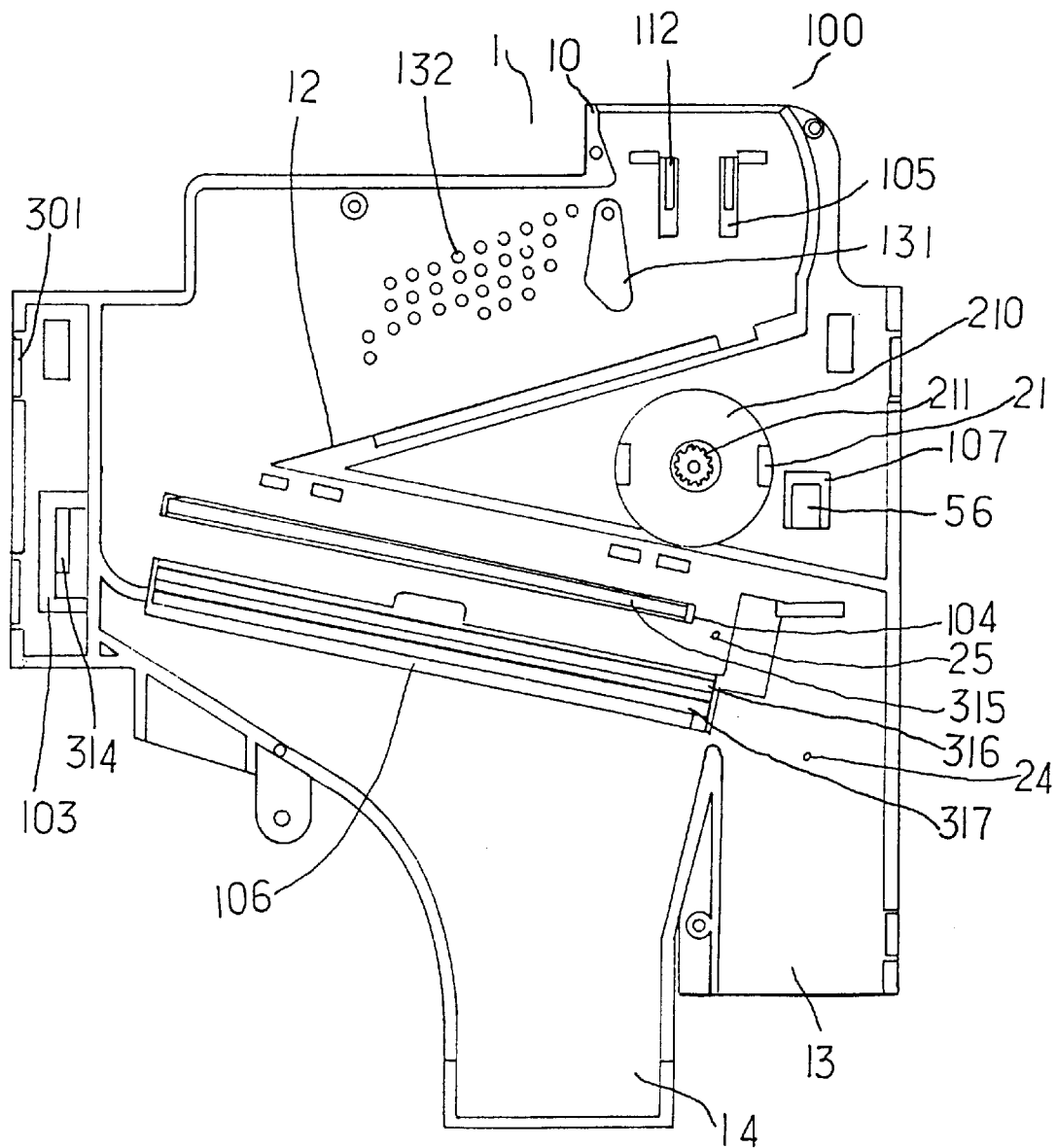
FIG. 5 shows the location of the coin track in the frame unit according to the present invention.
Figure 6:
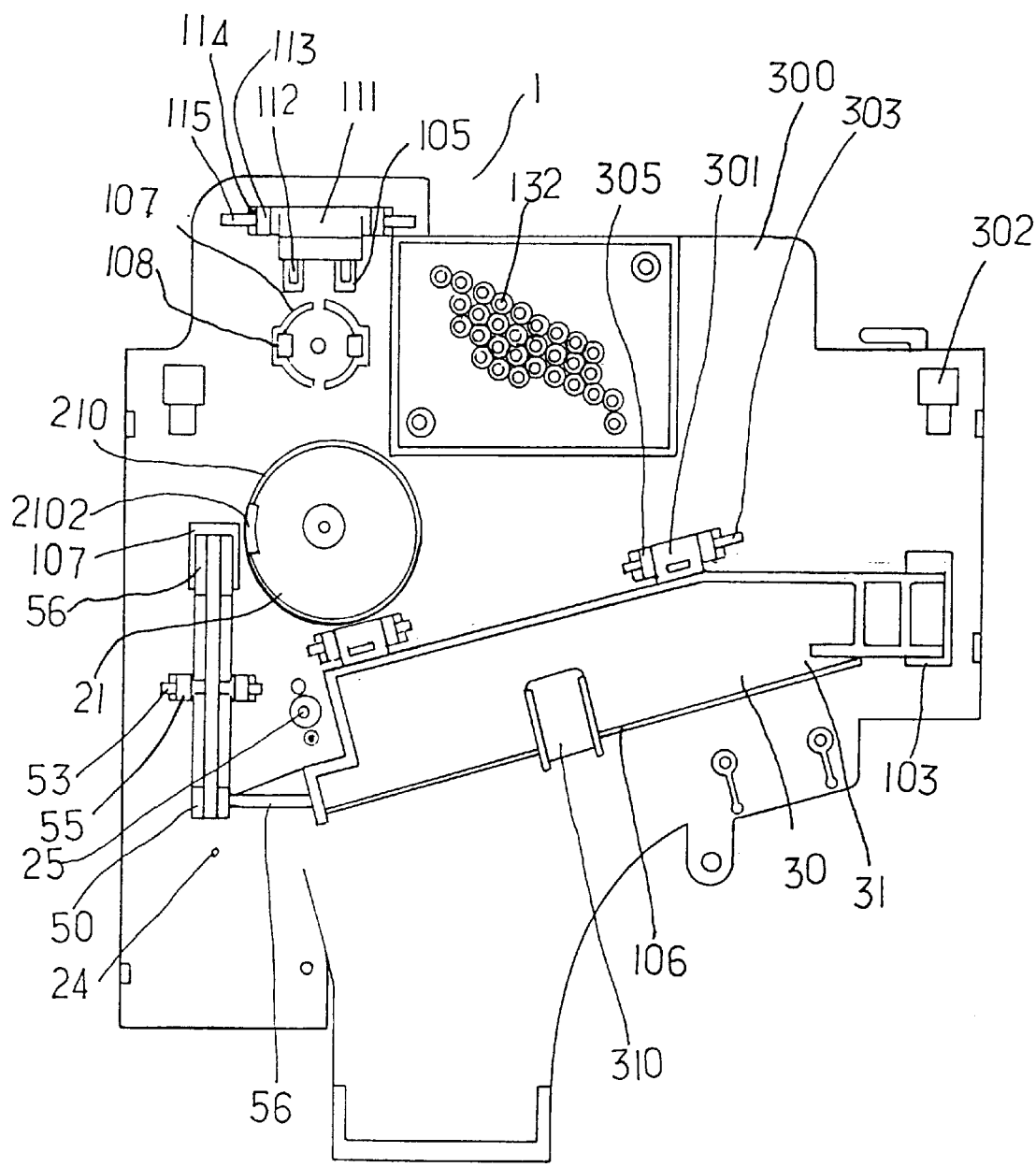
FIG. 6 is a rear side plain view of the present invention.
Figure 7:
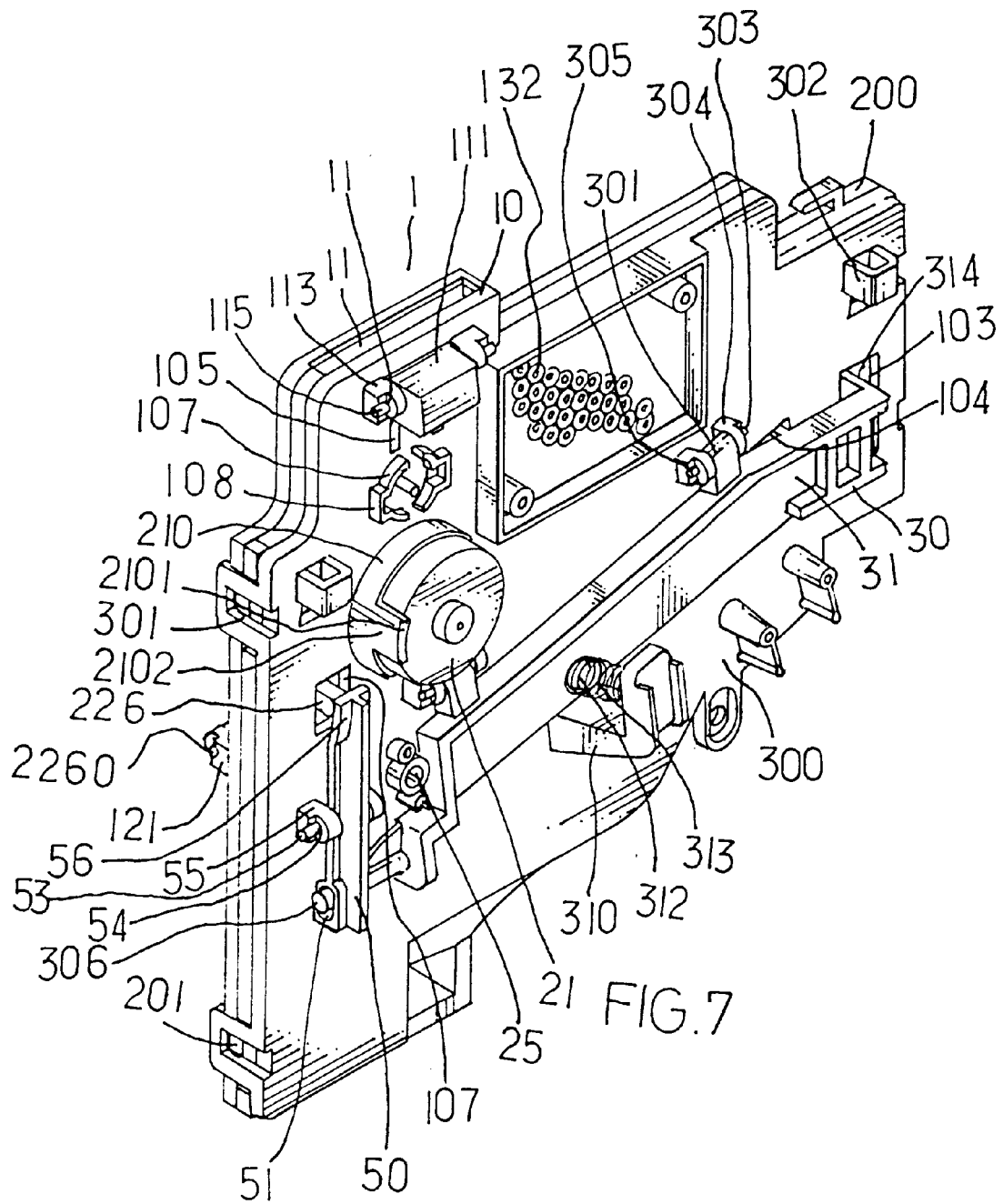
FIG. 7 is a perspective rear side view of the present invention.

Referring to FIGS. from 1 through 7, a pay phone in accordance with the present invention comprises generally a frame unit 1, a coin slot unit 100, a coin receiving unit 20, and a coin return unit 30.

The frame unit 1 comprises a front panel 200, and a rear panel 300. The front panel 200 comprises a plurality of coupling rods 201, which are respectively engaged into respective coupling holes 301 on the rear panel 300, enabling the front panel 200 and the rear panel 300 to be fastened together. The rear panel 300 has two hanging lugs 302 raised from the back side wall thereof for hanging on respective hooks 84 inside the housing 80 of the pay phone (see FIG. 14). Two axle holders 113 are mounted on the rear panel 300 near the top to hold a buffer block 111 of the coin slot unit 100 therebetween. The buffer block 111 of the coin slot unit 100 is pivotably connected between the axle holders 113 by pivot pins 115, which are respectively mounted in axle holes 114 on the axle holders 113. The buffer block 111 has two stop plates 112 inserted through respective slots 105 on the rear panel 300. Two axle holders 304 are mounted on the rear panel 300 on the middle to hold a coin return control board 31 of the coin return unit 30 therebetween. The coin return control board 31 is pivotably connected between the axle holders 304 by pivot pins 303, which are respectively mounted in axle holes 305 on the axle holders 304. A holder plate 55 is mounted on the rear panel 300 on the middle near the left side. A link 50 is pivotably connected to a pivot hole 54 on the holder plate 55 by a pivot pin 53. A motor mount 210 of the coin receiving unit 20 is mounted on the rear panel 300 adjacent to the link 50. A motor 21 of the coin receiving unit 20 is mounted on the motor mount 210. A retainer rod 2101 is integral with the motor mount 210, having a retaining portion 2102 which holds down the motor 21. The motor shaft of the motor 21 is inserted through a hole 2110 on the front panel 200, and fixedly mounted with a pinion 211, which is meshed with a big gear 212. A coin track 12 of the coin slot unit 100 is provided at the rear panel 300. Elongated slots 104,106 are provided at the rear panel 300 for receiving ribs 315,316,317 of the coin return control board 31. A first axle 2140 is provided at the front panel 200 to hold gears 212,213. A second axle 2140 is provided at the front panel 200 to hold a sector gear 214. A triangular post 2150 is provided at the front panel 200 for stopping against a locating block 215 at the sector gear 214. Round holes 24,25 are provided at the front panel 200 for holding a coin receiving sensor (not shown).

Figure 8:
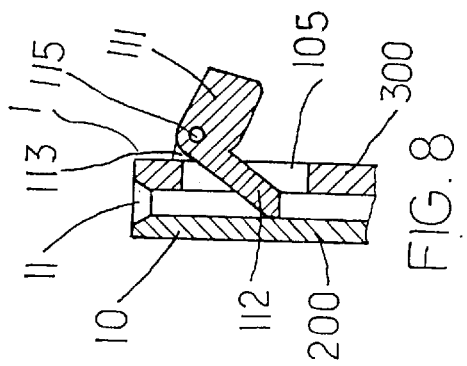
FIG. 8 is a sectional view of a part of the present invention, showing the positioning of the buffer block in the coin slot holder.
Figure 9:
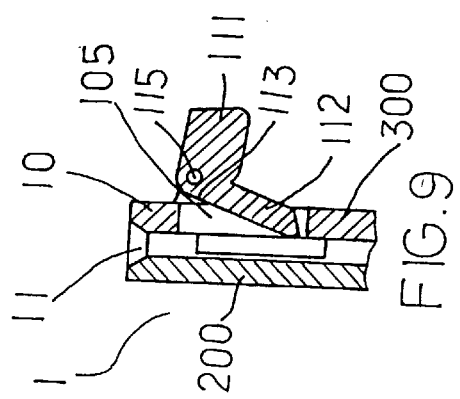
FIG. 9 is similar to FIG. 8 but showing a coin inserted into the coin slot, the buffer block forced backwards.
Figure 12:
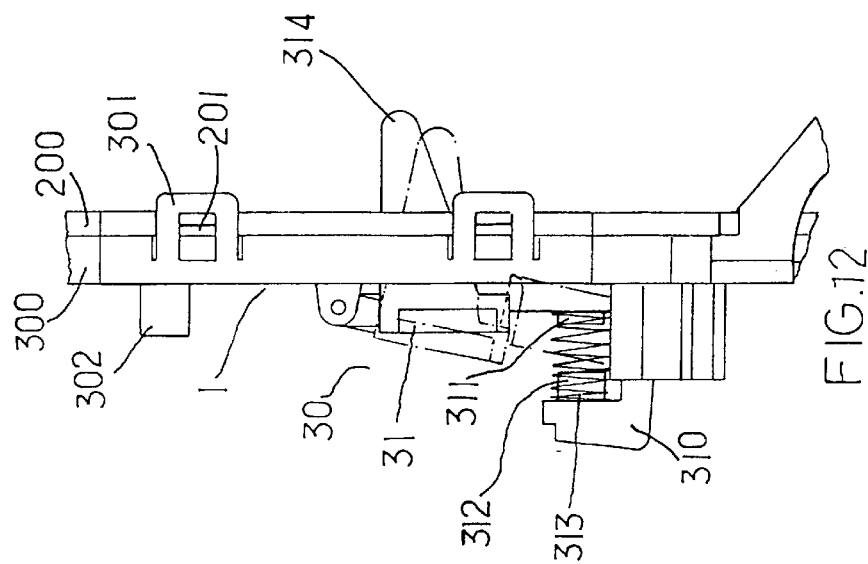
FIG. 12 is a sectional view of a part of the present invention, showing the operation of the coin return unit.

Referring to FIGS. 8 and 9 and FIGS. from 1 through 7 again, the coin slot unit 100 comprises a coin slot holder 10 integral with frame unit 1 at the top, a coin slot 11 defined within the coin slot holder 10, a coin box inlet 13, a coin track 12 extended from the coin slot 11 to the coin box inlet 13, a buffer block 111 pivotably mounted on axle holes 114 on the axle holders 113 by pins 115, the buffer block 111 having two stop plates 112 inserted through respective slots 105 on the rear panel 300 to buffer the falling of inserted coins, enabling the coins to fall to the coin track 12, a flange 107 provided at the frame unit 1 below the coin slot 11 and defining a hole 108 for holding a sensor that detects the authenticity of the coin passing through, a triangular guide plate 131 pivoted to the rear panel 300 of the frame unit 1 to guide an inserted coin to the coin track 12, and a plurality of through holes 132 provided at the rear panel 300 of the frame unit 1 through which an optical scanner is provided to scan the value the coin passing through the coin track 12.

Figure 10:
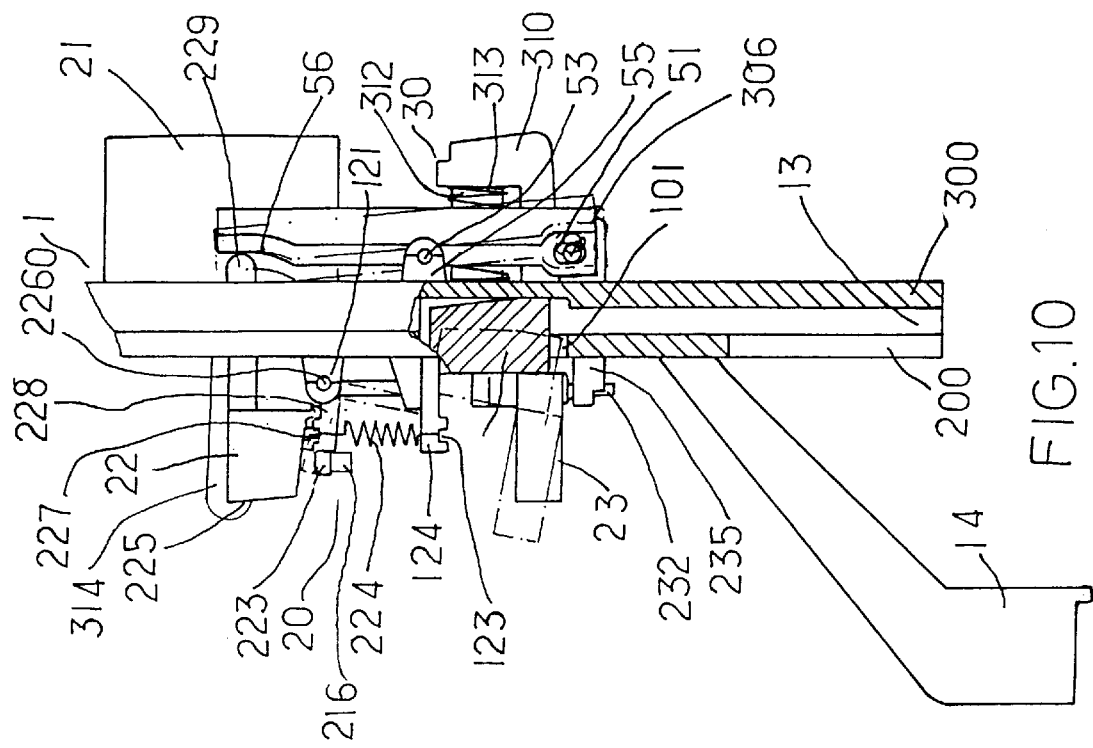
FIG. 10 is a sectional view of the coin receiving unit according to the present invention.
Figure 11:
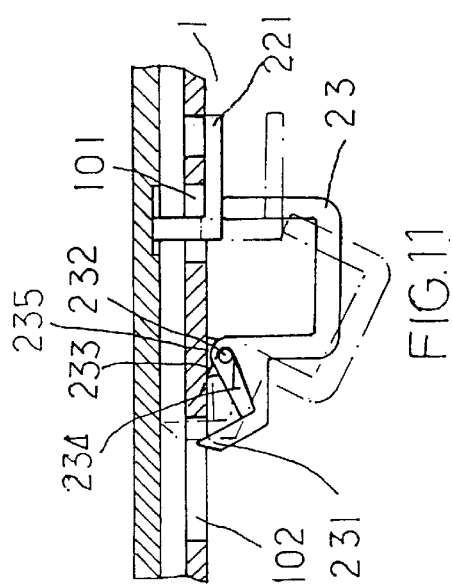
FIG. 11 is a sectional view of a part of the present invention, showing the L-shaped plate and the U-shaped plate of the coin receiving unit operated.
Figure 13:
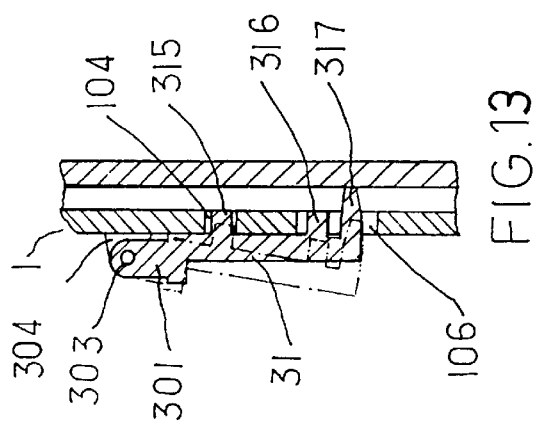
FIG. 13 is a sectional view of a part of the coin return unit according to the present invention.
Figure 14:
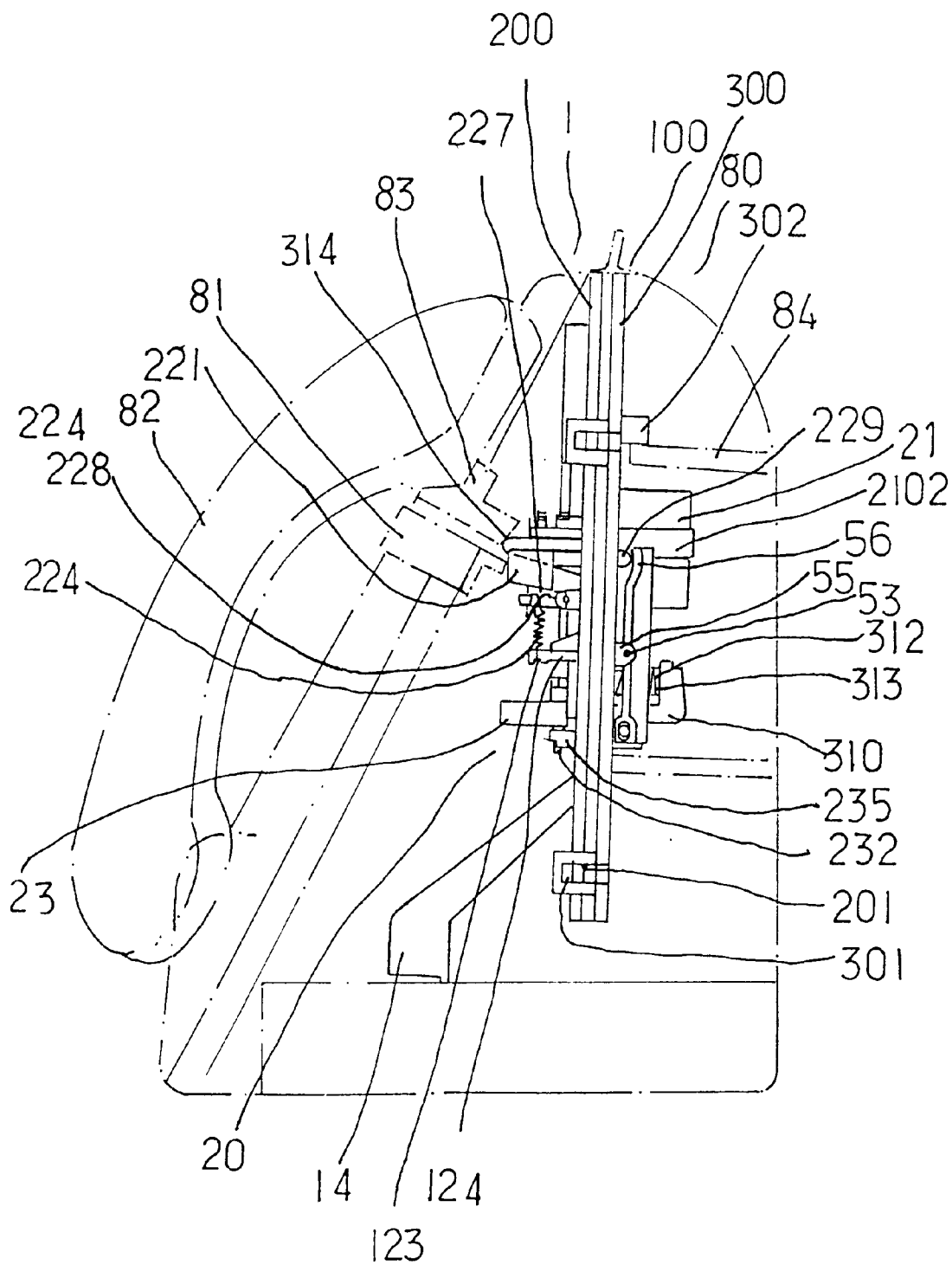
FIG. 14 is a schematic drawing showing the frame unit installed in the housing of the pay phone according to the present invention.
Figure 15:
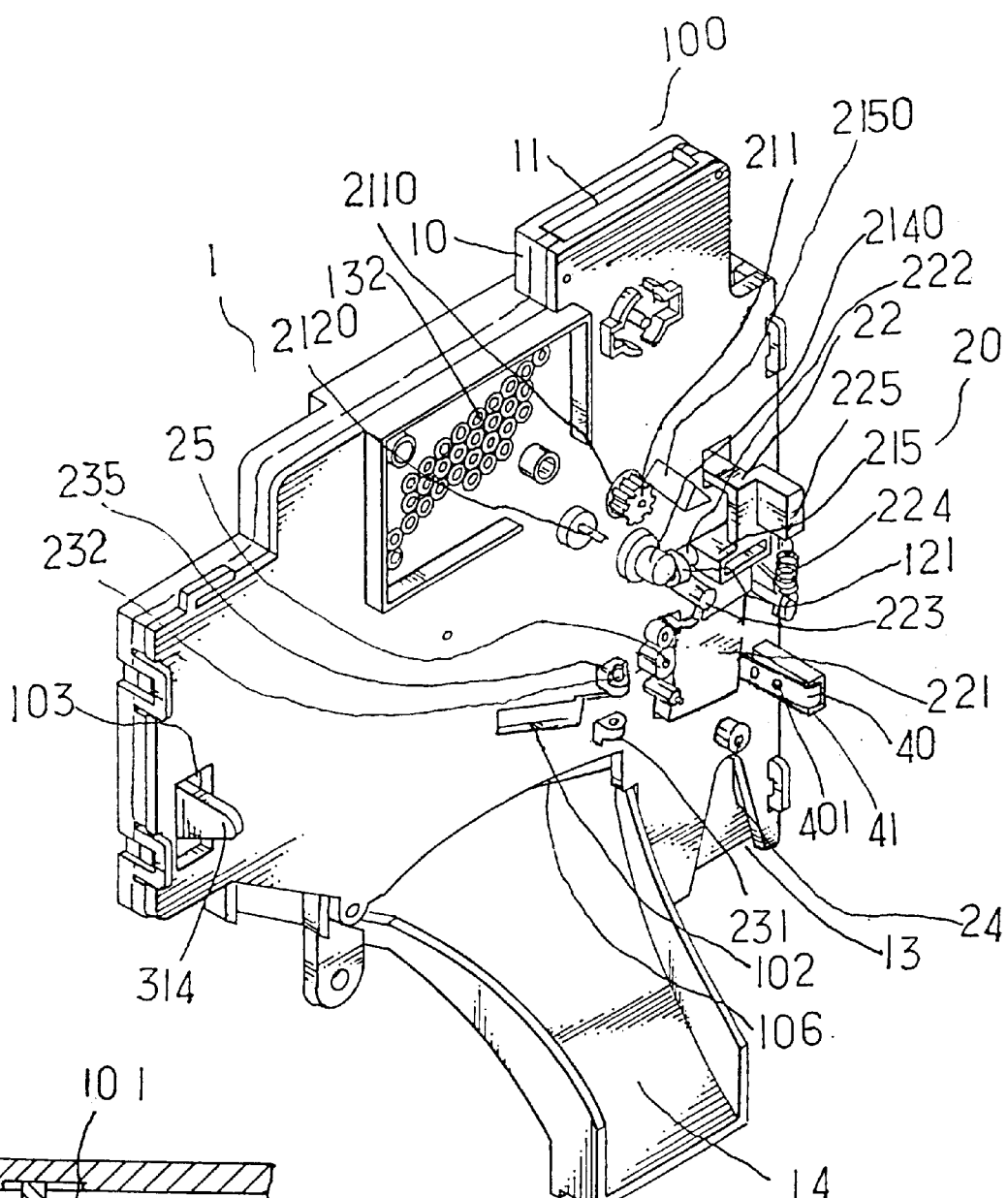
FIG. 15 is a perspective view of an alternate form of the present invention.
Figure 16:
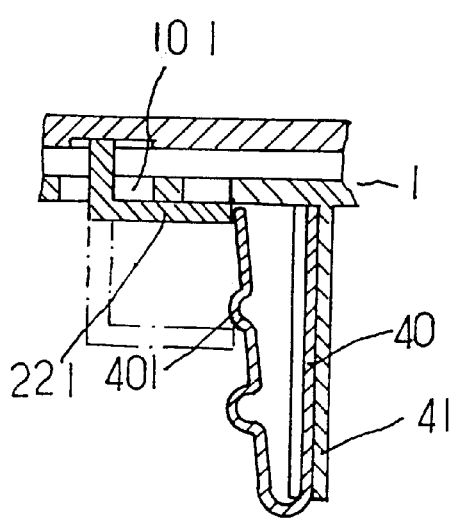
FIG. 16 is a sectional view in an enlarged scale of a part of FIG. 15, showing the L-shaped plate of the coin receiving control board moved relative to the spring plate.
Figure 17:
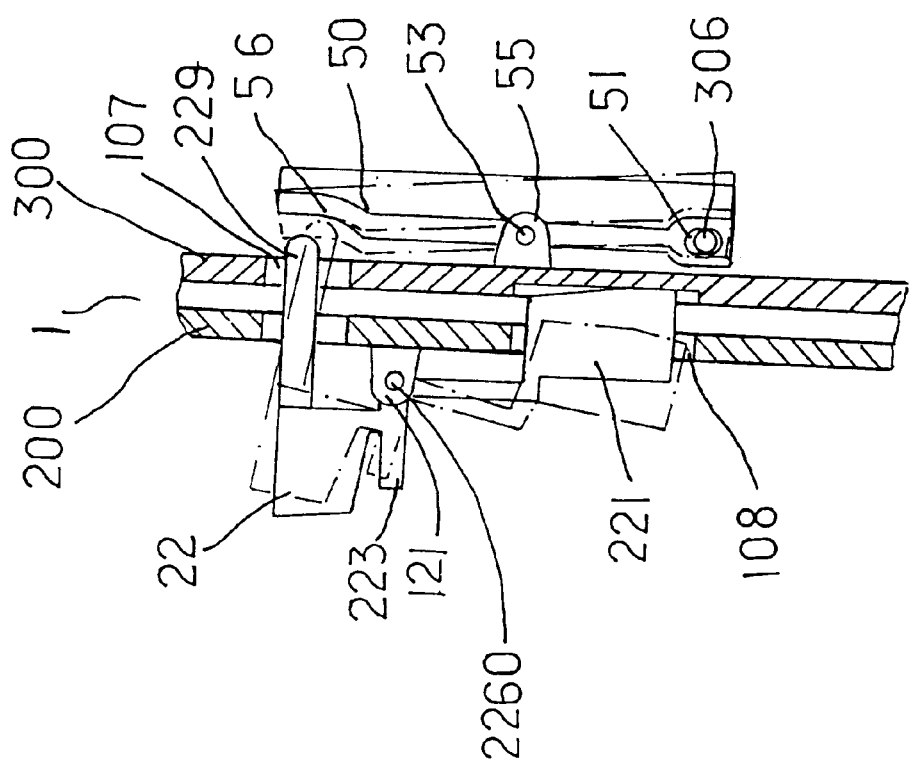
FIG. 17 is a sectional view in an enlarged scale of a part of FIG. 15, showing the link moved with the coin receiving control board.

Referring to FIGS. 10, 11 and 14 and FIGS. from 1 through 7 again, the coin receiving unit 20 comprises a motor 21, and a set of gears, namely, the big gear 212, the small gear 213 and the sector gear 214. The motor 21 is mounted on a motor mount 210 at the frame unit 1. The motor shaft of the motor 21 is inserted through a hole 2110 on the front panel 200, and fixedly mounted with a pinion 211, which is meshed with the big gear 212. The small gear 213 is integral with the big gear 212 at one side, and meshed with the sector gear 214. The sector gear 214 comprises a first locating block 215 and a second locating block 216. When the sector gear 214 is rotated counter-clockwise, the first locating block 215 is moved with the sector gear 214 toward the triangular post 2150 at the front panel 200. When the first locating block 215 is stopped at the triangular post 2150, the sector gear 214 will be returned. On the contrary, when the sector 214 is rotated clockwise, the second locating block 216 is moved with the sector gear 214 toward the triangular post 2150. When the second locating block 216 is stopped at the triangular post 2150, the sector gear 214 will be returned. A coin receiving control board 22 is driven by the second locating block 216 of the sector gear 214. The coin receiving control board 22 comprises a L-shaped plate 221 inserted through a hole 101 on the front panel 200 of the frame unit 1 into the coin passage way, a coupling rod 222 having an axial through hole 226 pivotably connected to a pivot hole 121 on a lug 122 at the front panel 200 of the frame unit 1, a projecting rod 223 perpendicularly raised from the periphery of the coupling rod 222 for acting against the second locating block 216 of the sector gear 214, a projecting block 228, a return spring 224 having one end fastened to a hole 227 at the projecting block 228 and an opposite end fastened to a notch 123 at a locating rod 124 at the frame unit 1, an elongated rod 229, and a press rod 225 above the projecting rod 223. When the sector gear 214 is rotated counter-clockwise, the projecting rod 223 will be forced by the second locating block 216 of the sector gear 214, causing the coin receiving control board 22 to be turned in one direction for permitting an inserted coin to be received and guided into the coin passage way. After the coin has been received, the return spring 224 immediately pulls the coin receiving control board 22 to its former position to close the coin passage way. The press rod 225 of the coin receiving unit 20 is coupled to a push button 81 at the housing 80 of the pay phone. When the push button 81 is depressed after the exchange line has been connected, the press rod 225 is forced downwards, causing the coin receiving unit 20 to open the coin passage way. When the push button 81 is released from the hand, the return spring 224 immediately returns the coin receiving unit 20 to the closed position. The coin receiving unit 20 further comprises a U-shaped plate 23 behind the L-shaped plate 221. The U-shaped plate 23 comprises a stop rod 231 at one end, a recessed hole 234, a return spring 233 received in the recessed hole 234, a pivot hole 237 in communication with the recessed hole 234, and a pivot pin 232 inserted through the pivot hole 237 and the return spring 233 and mounted in pivot holes 236 between two parallel lugs 235 at the frame unit 1. The U-shaped plate 23 has one end (the end remote from the stop rod 231) pressed on the L-shaped plate 221 of the coin receiving control board 22. The stop rod 231 of the U-shaped plate 23 is inserted through a rectangular hole 102 on the frame unit 1. When the coin receiving control board 22 is turned in one direction, the L-shaped plate 221 is disengaged from the hole 101, and the U-shaped plate 23 is forced to move the stop rod 231 through the rectangular hole 102 into the coin passage way. When the communication time is up, the sensor which is provided above the coin box inlet 13 immediately gives a signal to the motor 21, causing the motor 21 to turn the gears 211,212,213,214, so as to open the coin receiving unit 20 for letting inserted coins pass.

Referring to FIGS. from 1 through 7 and FIGS. from 10 through 14, the coin return unit 30 comprises a L-shaped locating frame 310 fixedly mounted on the back side of the frame unit 1, a coin return control board 31 pivoted to the frame unit 1, the coin return control board 31 having two lugs 301 near the top pivotably connected between the axle holders 304 at the rear panel 300 of the frame unit 1 by pivot pins 303, which are respectively mounted in axle holes 305 on the axle holders 304, a return spring 313 having one end fastened to a rod 312 at the L-shaped locating frame 310 and an opposite end connected to a rod 311 at the coin return control board 31, a round rod 306 at the bottom of the coin return control board 31, a link 50 pivoted to the frame unit 1 and coupled to the round rod 306, a projecting block 314 integral with the con return board 31 at one end remote from the link 50 and inserted through a hole 103 on the frame unit 1. The link 50 has a pivot hole 52 on the middle pivotably connected to the pivot hole 54 on the holder plate 55 at the rear panel 300 of the frame unit 1 by a pivot pin 53, a bottom coupling hole 51, which receives the round rod 306, and a top notch 56 corresponding to the elongated rod 229 of the coin receiving control board 22. The coin return control board 31 has a rib 315 inserted through the elongated slot 104 at the rear panel 300 of the frame unit 1, and ribs 316,317 inserted through the elongated slots 106 at the rear panel 300 of the frame unit 1. The rib 317 is connected to the rear end of the coin track 12, forming a part of the coin track 12. When the handset 82 is hung up, a press block 83 is forced downwards against the projecting block 314, causing the coin return control board 31 to be turned backwards, enabling the coin(s) to fall from the coin passage way to a coin return assembly 14, and at the same time the top notch 56 of the link 50 is forced against the elongated rod 229 of the coin receiving control board 22, causing the coin receiving unit 20 to be closed. When the handset 82 is picked up, the coin return control board 31 is forced by the return spring 313 to close the coin return unit 30.

FIGS. from 15 through 17 show an alternate form of the present invention. According to this alternate form (manual pay phone), the motor 21, the gears 211,212,213,214 and the U-shaped plate 23 are eliminated, and a spring plate 40 is fastened to a recessed hole 41 at the frame unit 1. The spring plate 40 has raised portions 401 for securing the L-shaped plate 221 of the coin receiving control board 22 in position. When the handset 80 is picked up, the coin return unit 30 is closed. When a coin is inserted into the coin slot 11 and the exchange line is connected, the push button 81 is depressed and lowered against the press rod 225 of the coin receiving control board 22, causing the coin receiving control board 22 to be turned in one direction, at this time the L-shaped plate 221 is retained in position by the raised portions 401 of the spring plate 40, and therefore the coin receiving unit 20 is retained in the opened position. The sensor which is mounted in the hole 25 at the rear end of the coin track 12 detects the number of coins passing through the coin track 12. When the metered communication time is going to be up, the pay phone produces a sound, informing the user to insert coins again. When a coin or coins are inserted again, inserted coins are directly guided to the coin box inlet, enabling the user to keep talking over the phone without operating the push button 81. When the handset 82 is hung up, the press block 83 is forced downwards against the projecting block 314, causing the coin return control board 31 to be turned backwards to open the coin return unit 30, and at the same time the link 50 is turned in one direction to force the top notch 56 against the elongated rod 229 of the coin receiving control board 22, causing, the L-shaped plate 221 to be released from the constraint of the raised portions 401 of the spring plate 40, and therefore the coin receiving unit 20 is returned to the closed position.

What is claimed is:

1. A pay phone comprising:

a frame unit having a post;

a coin slot unit mounted in said frame unit, said coin slot unit comprising a coin slot holder defining a coin slot, a coin box inlet, a coin track extended between said coin slot and said coin box inlet, a buffer block pivoted to said coin slot holder which buffers the falling of coins being inserted into said coin slot;

a coin receiving unit mounted in said frame unit, said coin receiving unit comprising a motor, said motor having a pinion at an output shaft thereof, a big gear meshed with said pinion, a small gear integral with said big gear at one side, a sector gear meshed with said small gear, said sector gear comprising a first locating block and a second locating block spaced from the post of said frame unit, said first locating block and said second locating block being turned with said sector gear relative to the post of said frame unit to limit the turning angle of said sector gear and said motor, a coin receiving control board moved by said second locating block of said sector gear, said coin receiving control board comprises a L-shaped plate inserted through a hole on said frame unit into said coin track, a coupling rod pivoted to said frame unit, a projecting rod perpendicularly raised from the periphery of said coupling rod for acting against the second locating block of said sector gear, a projecting block, a return spring having one end fastened to said projecting block and an opposite end fastened to said frame unit, an elongated rod, and a press rod above said projecting rod, said projecting rod being forced by said second locating block of said sector gear, causing said coin receiving control board to be turned in one direction for permitting inserted coins to be received and guided into said coin track when said sector gear is rotated counter-clockwise, said press rod being controlled by a push button to move said coin receiving control board away from said coin track for letting inserted coins pass, a U-shaped plate behind said L-shaped plate, said U-shaped plate comprising a stop rod at a front end thereof, a recessed hole, a return spring received in said recessed hole, a pivot holein communication with said recessed hole, and a pivot pin inserted through the pivot hole and the return spring of said U-shaped plate and mounted said frame unit, and a rear end pressed on said L-shaped plate, said stop rod of said U-shaped plate being inserted through a rectangular hole on said frame unit, said U-shaped plate being forced to move said stop rod through said rectangular hole into said coin track when said coin receiving control board is turned in one direction, said motor being controlled by a sensor to turn said big gear, said small gear and said sector gear when the communication time is up, causing said coin receiving control board to be turned in one direction to open said coin receiving unit; and a coin return unit mounted in said frame unit, said coin return unit comprising a L-shaped locating frame fixedly mounted on said frame unit at a back side, a coin return control board pivoted to said frame unit, said coin return control board having two lugs at a top side respectively pivoted to said frame unit, a return spring having one end fastened to a rod at said L-shaped locating frame and an opposite end connected to a rod at said coin return control board, a round rod at a bottom side of said coin return control board, a link pivoted to said frame unit and coupled to said round rod, a projecting block integral with said coin return board at one end remote from said link and inserted through a hole on said frame unit, said link having a pivot hole on the middle pivoted to said frame unit, a bottom coupling hole, which receives said round rod, and a top notch corresponding to the elongated rod of said coin receiving control board, said coin return control board having a ribs inserted through elongated slots on said frame unit.

2. The pay phone of claim 1 further comprising a spring plate mounted in a hole on said frame unit, said spring plate having raised portions for securing said L-shaped plate of said coin receiving control board in the opened position.

* * * * *